United States Patent
Yokoyama

(10) Patent No.: US 9,285,659 B2
(45) Date of Patent: Mar. 15, 2016

(54) OPTICAL ACCESSORY ADAPTER

(71) Applicant: CANON KABUSHIKI KAISHA, Tokyo (JP)

(72) Inventor: Akira Yokoyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/182,539

(22) Filed: Feb. 18, 2014

(65) Prior Publication Data

US 2014/0233937 A1   Aug. 21, 2014

(30) Foreign Application Priority Data

Feb. 21, 2013   (JP) .................................. 2013-032152

(51) Int. Cl.
*G03B 17/00* (2006.01)
*G03B 17/56* (2006.01)

(52) U.S. Cl.
CPC ............ *G03B 17/566* (2013.01); *G03B 17/565* (2013.01)

(58) Field of Classification Search
CPC ....................................................... G03B 17/14
USPC ......................................................... 396/530
See application file for complete search history.

(56) References Cited

U.S. PATENT DOCUMENTS

| | | | | |
|---|---|---|---|---|
| 4,281,916 A * | 8/1981 | Aoyagi | ......................... | 396/298 |
| 4,901,098 A | 2/1990 | Salles | | |
| 5,208,624 A * | 5/1993 | MacKay | ....................... | 396/544 |
| 7,899,311 B1 * | 3/2011 | Kearney et al. | ................. | 396/12 |
| 2013/0128110 A1 * | 5/2013 | Jannard | ......................... | 348/375 |

FOREIGN PATENT DOCUMENTS

| | | |
|---|---|---|
| JP | 06-51386 A | 2/1994 |
| JP | 3088166 U | 8/2002 |
| JP | 2004-109630 A | 4/2004 |
| JP | 2005-004111 A | 1/2005 |
| JP | 2013-020098 A | 1/2013 |

OTHER PUBLICATIONS

The Motion Picture and TV Engineering, No. 651, p. 51, Nov. 2006 (Motion Picture and Television Engineering Society of Japan).

\* cited by examiner

*Primary Examiner* — Clayton E Laballe
*Assistant Examiner* — Dennis Hancock
(74) *Attorney, Agent, or Firm* — Rossi, Kimms & McDowell LLP

(57) ABSTRACT

An optical accessory adapter is used to couple together a lens apparatus and an optical accessory attached to an object side portion of the lens apparatus having fitting attachment diameters different from each other. The adapter is provided with a cutout portion in a part of a region outside the attachment diameter of the lens apparatus on an object side surface thereof.

19 Claims, 5 Drawing Sheets

OPTICAL ACCESSORY ADAPTER

BACKGROUND OF THE INVENTION

1. Field of the Invention

The present invention relates to an optical accessory adapter inserted between a lens apparatus and an optical accessory.

2. Description of the Related Art

Optical accessories (except for special-purpose accessories) to be attached to lens apparatuses are not built for the purpose of attachment to specific lens apparatuses, but optical accessories typically attached to lens apparatuses are built for general purpose.

In the case of ordinary lens apparatuses other than lens apparatuses used for the special purpose of magnifying imaging such as microscopes and macro lenses, imaging rays are divergent when seen in the direction from the frontmost lens toward the object. Therefore, optical accessories attached to such lens apparatuses on their object side have diameters equal to or larger than the attachment diameters of the lens apparatus.

Particularly in the case of lens apparatuses for wide angle imaging, the divergent angle of imaging rays is large. Therefore, in order to prevent interference of imaging rays and the lens barrel, the diameter of the front end portion of the lens barrel is enlarged, or the front end portion of the lens barrel is cut in a petal shape.

An optical accessory and an optical accessory adapter are disclosed, for example, in the U.S. Pat. No. 4,901,098. Specifically, this patent document discloses an optical accessory adapter constructed as an annular member (doughnut ring 100) having an aperture (varying aperture 112) allowing it to be attached to the lens apparatus. The optical accessory adapter is attached to a lens apparatus, and then a ring member (back ring 120) provided at the rear end of an optical accessory (matte box) is coupled to the annular member, whereby the lens apparatus, the adapter, and an optical accessory are coupled together.

THE MOTION PICTURE & TV ENGINEERING (No. 651, P. 51, November, 2006, Motion Picture and Television Engineering Society of Japan) discloses, in Picture 1 and FIG. 1 on page 51, an enlarged shape of the front end portion of a lens barrel. Japanese Patent Application Laid-Open No. 2005-4111 discloses a lens barrel cut in a petal shape.

In the case where the diameter of the front end portion of the lens barrel is enlarged as is the case with one disclosed in the aforementioned U.S. Pat. No. 4,901,098, if the diameter of the front end portion is matched with the attachment diameter of the optical accessory, an optical accessory adapter is not needed when using the optical accessory. However, this solution invites an increase in the outer diameter and an increase in the weight of the lens apparatus.

If an optical accessory is attached to a wide angle lens disclosed in Japanese Patent Application Laid-Open No. 2005-4111 using the optical accessory adapter disclosed in the aforementioned U.S. Pat. No. 4,901,098, there is a possibility that an inner part of the optical accessory adapter may extend inwardly beyond the cut portion of the lens barrel to interfere with imaging rays.

The interference of the optical accessory adapter and imaging rays can be prevented by shifting the position of the optical accessory adapter toward the image side. However, this may possibly prevent an appropriate space to be left between the optical accessory and the lens apparatus.

Referring, by way of example, to U.S. Pat. No. 4,901,098, a filter holding frame (filter holder body 140) disclosed in this patent document is inserted into the front end portion of the lens apparatus. Thus, as the optical accessory adapter enters from the front end of the lens apparatus toward the image side, the filter holding frame also comes closer to the lens apparatus, possibly leading to interference of the lens apparatus and the filter holding frame.

SUMMARY OF THE INVENTION

The present invention provides an optical accessory adapter with which excellent images can be provided using an optical accessory without an increase in the size or weight of a lens apparatus.

According to the present invention, there is provided an adapter used to couple together a lens apparatus and an optical accessory attached to an object side portion of the lens apparatus having fitting attachment diameters different from each other, wherein the adapter is provided with a cutout portion in a part of a region outside the attachment diameter of the lens apparatus on an object side surface thereof.

The present invention enables the use of an optical accessory with which excellent images can be provided, without an increase in the size or weight of a lens apparatus.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
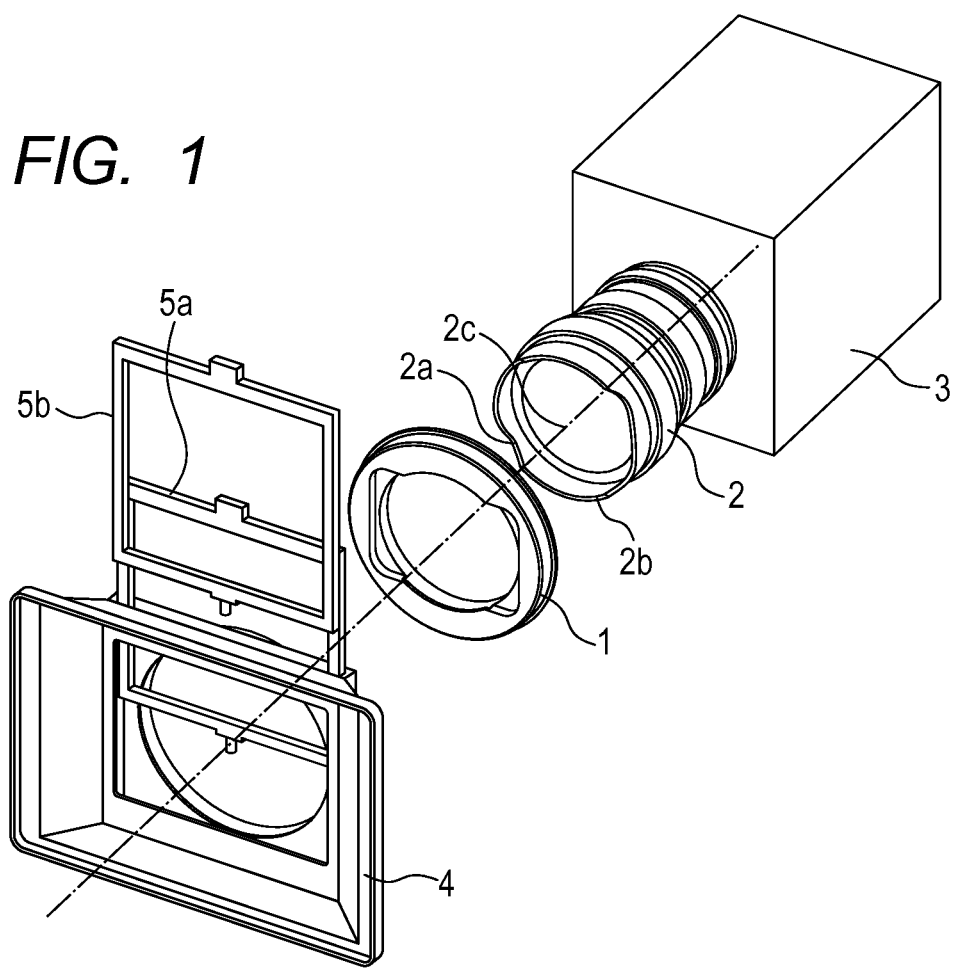
FIG. 1 shows a typical construction of an image pickup apparatus according to a first embodiment, of the present invention.

FIG. 1 shows a typical construction of a lens apparatus (or image pickup apparatus) using an optical accessory adapter according to an embodiment of the present invention.

First Embodiment

In the following, an optical accessory adapter according to a first embodiment of the present invention will be described with reference to FIGS. 1, 2, 3, 4 and 5.

FIG. 1 shows a typical construction of an image pickup apparatus using an optical accessory adapter according to the embodiment of the present invention. In this apparatus, a lens apparatus 2 is mounted on a camera 3, and a matte box 4 as an optical accessory is attached to the front end of the lens apparatus 2 by means of an optical accessory adapter 1. The optical accessory is fitted into the object side end part of the lens apparatus so as to be attached thereto. The optical accessory adapter is used to couple together the lens apparatus and the optical accessory having attachment diameters different from each other. The front end portion of the lens apparatus 2 has petal-shaped cutout potions 2a provided respectively on both horizontal sides to prevent interference with imaging rays and front end portions 2b left uncut provided respectively at upper and lower positions. The front end portions 2b are located closer to the object than the vertex of the frontmost glass 2c of the lens apparatus.

The matte box 4 serves as a hood and is adapted to allow a filter holding frames 5a and 5b to be inserted into/retracted out of it. The filter holding frames 5a and 5b respectively hold optical filters to give various effects on shot images formed by light coming from an object and having passed through the filters. When the attachment diameter of the matte box 4 and the attachment diameter of the lens apparatus 2 are different from each other, the optical accessory adapter 1 having an annular shape is used to correct the difference in the diameter, thereby allowing the matte box 4 to foe attached to the lens apparatus 2.

Figure 2:
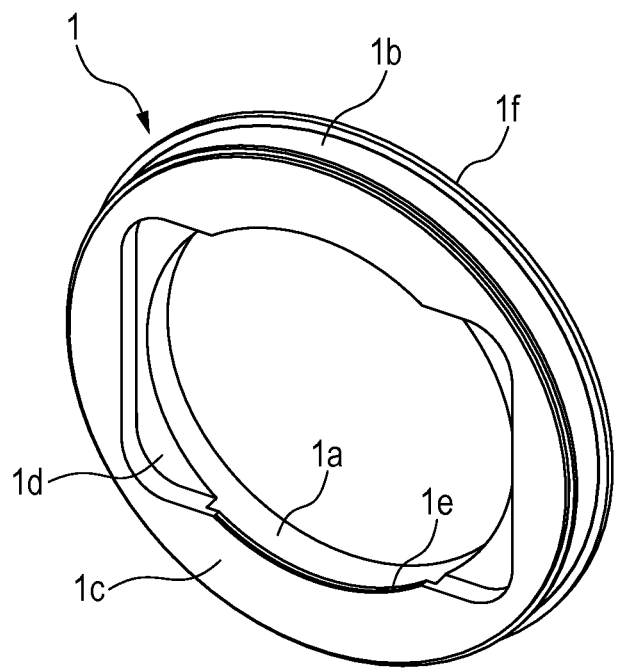
FIG. 2 shows the structure of an optical accessory adapter according to the first embodiment of the present invention.

FIG. 2 shows the structure of the optical accessory adapter 1 according the present invention.

The inner circumference 1a is adapted in such a way that the outer circumference of the attachment portion of the lens apparatus 2 can be fitted into it. The outer circumference 1b is adapted in such a way that the inner circumference of the attachment portion of the matte box 4 can be fitted on it. The optical accessory adapter 1 has, on its object side 1c, a nearly rectangular cutout portion 1d provided in a part of the region outside the attachment diameter of the lens apparatus 2. The nearly rectangular cutout portion 1d does not pass through the optical accessory adapter 1 along the optical axis. The long side of the cutout portion 1d is longer than the diameter of the inner circumference 1a, while the short side of the cutout portion 1d is shorter than the diameter of the inner circumference 1a, so that the inner circumference 1a remains, at least partly, along the depth (i.e. the length along the optical axis) of the cutout portion 1d. The shape (nearly rectangular shape) of the contour of the cutout portion 1c is similar to the shape of the image pickup area in which an image is picked up by the camera apparatus coupled with the lens apparatus. The optical accessory adapter 1 has, on its object side, a lens abutting portion 1e having a diameter smaller than the diameter of the inner circumference 1a. The lens abutting portion extends on one and the opposite sides of the cutout portion 1d. The optical accessory adapter 1 further has an accessory abutting portion 1f provided near the outer circumference 1b and having an outer diameter larger than the diameter of the outer circumference 1b.

Figure 3:
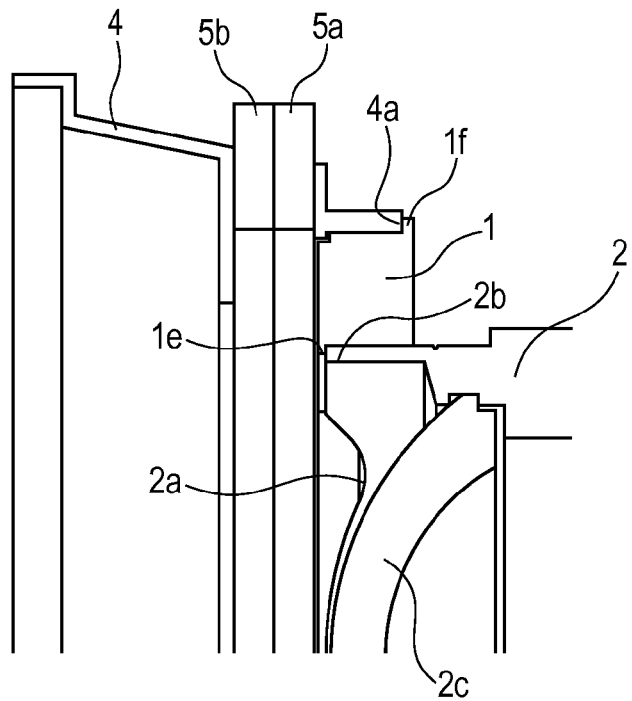
FIG. 3 is a cross sectional view of the image pickup apparatus according to the first embodiment of the present invention.

FIG. 3 is a cross sectional view of the portion from the front end of the lens apparatus 2 to the matte box 4.

The lens apparatus 2, the optical accessory adapter 1, and the matte box 4 can be coupled together by attaching the optical accessory adapter 1 to the lens apparatus 2 and then attaching the matte box 4 to the optical accessory adapter 1. The front end portion 2b and the lens abutting portion 1e come into abutment with each other to position the lens apparatus 2 and the optical accessory adapter 1 with respect to the direction of the optical axis. Furthermore, the accessory abutting portion 1f and an abutting portion 4a of the matte box 4 come into abutment with each other to position the optical accessory adapter 1 and the matte box 4 with respect to the direction of the optical axis. In this connection, the object side surface of the optical accessory adapter 1 is dimensioned in such a way as not to enter the operation space of the filter holding frame 5a. This allows insertion/retraction of the filter holding frames 5a and 5b, while the matte box 4 remains attached to the lens apparatus 2.

Figure 4:
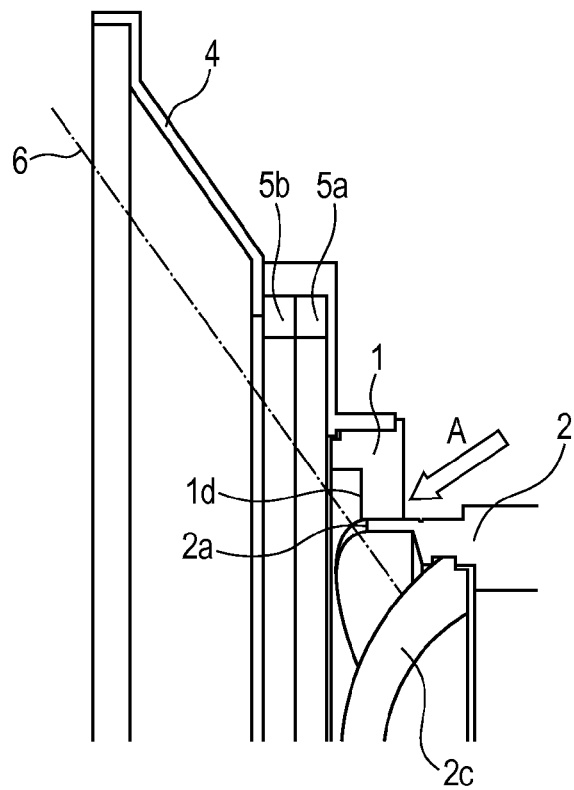
FIG. 4 is a cross sectional view of the image pickup apparatus according to the first embodiment of the present invention, taken along the diagonal direction thereof.

FIG. 4 is a cross sectional view taken along the diagonal direction of the image pickup area, in which the angle of imaging rays 6 is largest.

Imaging rays is divergent when seen in the direction from the frontmost glass 2c toward the object. In the case where the lens apparatus 2 is a wide angle lens, the divergent angle of imaging rays 6 is so large that imaging rays pass through the region of the petal-shaped cutout portion 2a. The optical accessory adapter 1 is attached to the lens apparatus 2 in such an orientation that the long side of the cutout portion 1d is substantially parallel to the horizontal direction of the image (i.e. the direction of the long side of the image pickup area). This allows the imaging rays 6 having passed through the petal-shaped cutout portion 2a to pass through the cutout portion 1d without impinging on the inner circumference 1a of the optical accessory adapter 1. Moreover, since the cutout portion 1d does not pass through the optical accessory adapter 1 along the direction of the optical axis, unwanted light incident on the matte box 4 from the rear side of the lens apparatus 2 as indicated by arrow A in FIG. 4 is blocked. Thus, unwanted light will not be reflected by the back surface of the filters held by the filter holding frames 5a and 5b to deteriorate the image quality.

As described above, with the optical accessory adapter according to this embodiment, images having excellent quality not affected by vignetting can be picked up when an optical accessory is used with a wide angle lens having a petal-shaped cutout at the front end of the barrel. Furthermore, it is not necessary to design a wide angle lens to have an enlarged diameter at the front end of the lens apparatus in order to use an optical accessory without inviting vignetting. Therefore, the size of the lens apparatus can be made small.

Figure 5:
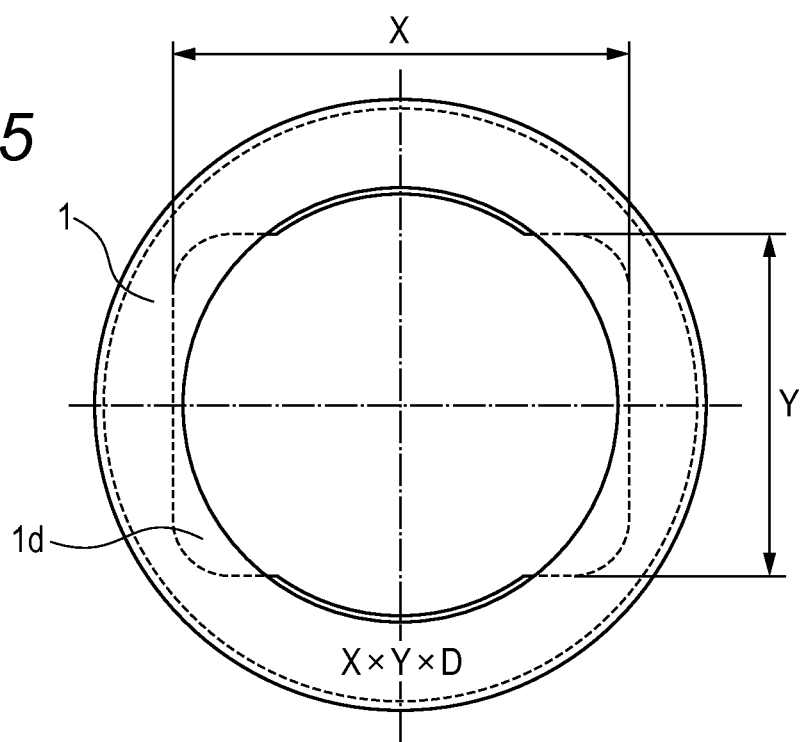
FIG. 5 is a rear view of the optical accessory adapter according to the present invention.

As shown in FIG. 5, the length X of the long side of the cutout portion 1d, the length Y of the short side of the cutout portion 1d, and the depth D of the cutout portion 1d from the object side surface or the lens abutting portion may be inscribed as numerical values on some surface of the optical accessory adapter 1 that allows the inscription without impairing the function of the adapter 1. This allows a user to see, beforehand without checking the image, whether or not the optical accessory adapter will interfere with imaging light when attached to the lens apparatus.

The optical accessory adapter according to this embodiment can be attached to a lens apparatus that does not need to have a petal-shaped cutout, as will be understood.

Although the bottom of the nearly rectangular cutout portion provided on the optical accessory adapter is illustrated as a flat surface in the drawings showing this embodiment, the bottom surface may be tapered so that the cut becomes deeper (in the direction from the object to the lens when attached to the lens apparatus) from outer positions toward inner positions. In this case also, the same advantages can be achieved, as will be understood.

The shape of the cutout portion is not limited to a rectangular shape, but it may have other shapes such as a pincushion shape and barrel shape, as long as the cutout portion is larger than the range of imaging rays on the object side surface of the optical accessory adapter.

Second Embodiment

An optical accessory adapter according to a second embodiment of the present invention will be described in the following with reference to FIGS. 6, 7 and 8.

Figure 6:
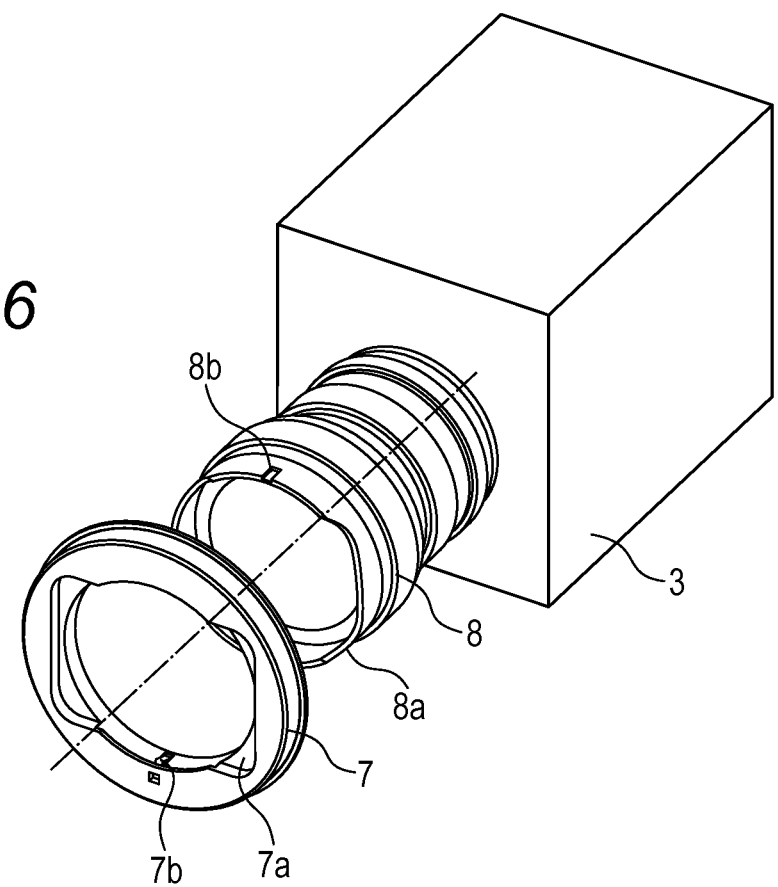
FIG. 6 shows a typical construction of an image pickup apparatus according to a second embodiment of the present invention.

FIG. 6 shows a typical construction of an image pickup apparatus using an optical accessory adapter according to the second embodiment of the present invention. In this apparatus, a lens apparatus 8 is mounted on a camera 3, and an optical accessory (not shown) is attached to the front end of the lens apparatus 8 by means of an optical accessory adapter 7. The optical accessory adapter 7 according to this embodiment has an angle phase determining unit that determines the angle of attachment of the optical accessory adapter and the lens apparatus. The optical accessory adapter 7 has a nearly rectangular cutout portion 7a and a movable projection 7b provided on its inner circumference. The front end portion of the lens apparatus 8 has a petal-shaped cutout portion 8a and a recess 8b provided on its outer circumference.

The operation of the angle phase determining unit of the optical accessory adapter according to this embodiment will be described with reference to FIGS. 7 and 8. The angle phase determining unit includes a movable projection 7b, a spring 7d, a restricting projection 7e, a restricting hole 7f, and a recess 8b.

Figure 7:
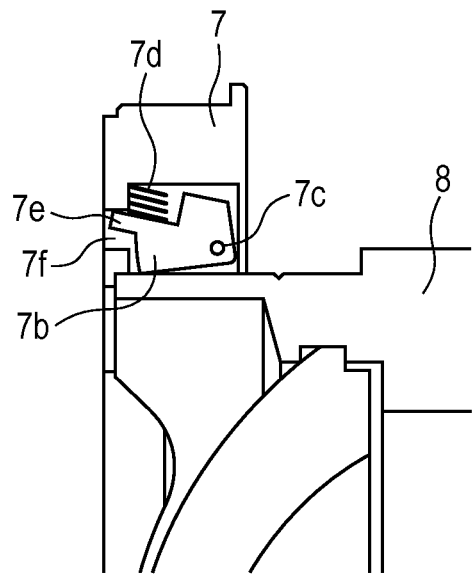
FIG. 7 is a cross sectional view of a portion around a movable projection in the second embodiment of the present invention.
Figure 8:
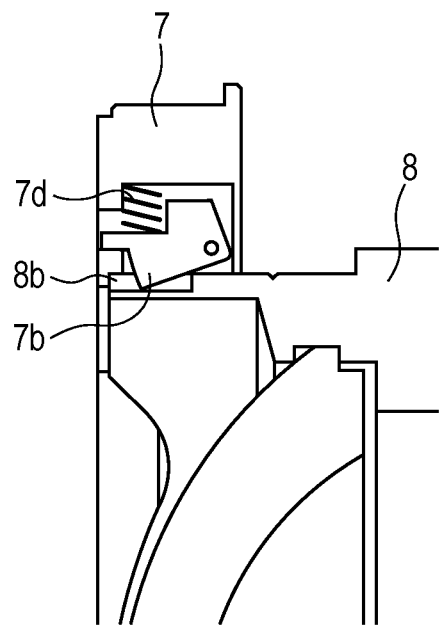
FIG. 8 is a cross sectional view of the portion around a movable projection in the second embodiment of the present invention in the state in which the movable projection is received in a recess.

FIG. 7 shows the status of the movable projection 7b in the state where the optical accessory adapter 7 is attached to the lens apparatus 8. The movable projection 7b is movable only in the rotational direction about the rotation center 7c and adapted to swing within a movable range restricted by the restricting projection 7e and the restricting hole 7f while being biased in the diametrically inward direction by the spring 7d. The movable projection 7b is pushed down in the diametrically outward direction by the lens apparatus 8 to rotate about the rotation center 7c to retract. Thus, the optical accessory adapter 7 can be attached to the lens apparatus 8 without being blocked by the movable projection 7b.

As the optical accessory adapter 7 is rotated relative to the lens apparatus 8, the movable projection 7b falls into (or is received in) the recess 8b of the lens apparatus 8 by virtue of the biasing force of the spring 7d eventually when the phase of the movable projection 7b and the phase of the recess 8b match. This state is illustrated in FIG. 8. Since the movable projection 7b is movable only in the rotational direction about the rotation center 7c, once the movable projection 7b is received in the recess 8b, the optical accessory adapter 7 cannot rotate relative to the lens apparatus 8, though the optical accessory adapter 7 may rotate a little due to play of the movable projection 7b in the recess 8b.

The angular positional relationship between the movable projection 7b and the recess 8b is arranged in such a way that the long side of the cutout portion 7a of the optical accessory adapter 7 is oriented substantially parallel to the horizontal direction of the image in this state, whereby phase adjustment can be achieved without need for checking vignetting of the image when attaching the optical accessory adapter 7.

As described above, this embodiment has an advantage of improved usability in addition to the advantages of the first embodiment, because the effort of checking in adjusting the phase of the optical accessory adapter relative to the lens apparatus can be eliminated.

Since the movable projection can project from/retract into the inner circumference of the optical accessory adapter, the optical accessory adapter can be attached to a lens apparatus that does not have a recess like that described above.

While the movability of the positioning projection of the optical accessory adapter will add convenience, the projection for positioning does not necessarily need movability. An optical accessory adapter having a fixed projection to be received in a recess of a lens apparatus can also achieve the advantages of the present invention.

While in this embodiment a projection is provided on the optical accessory adapter and a recess is provided on the lens apparatus, a projection may be provided on the lens apparatus and a recess may be provided on the optical accessory adapter. In the latter case also, the same advantages can be achieved. Specifically, the operation and advantages of the present invention can also be achieved by providing a projection projectable/retractable in the radial direction on an attachment circumferential portion of one of the lens apparatus and the optical accessory adapter and providing a recess adapted to receive the projection on an attachment circumferential portion of the other of the lens apparatus and the optical accessory adapter.

Third Embodiment

An optical accessory adapter according to a third embodiment of the present invention will foe described in the following with reference to FIGS. 9 and 10.

Figure 9:
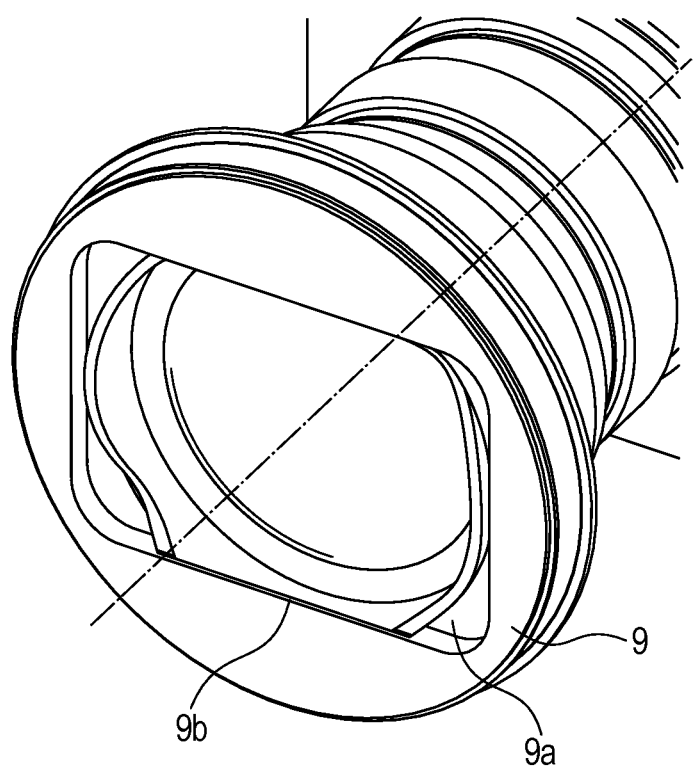
FIG. 9 shows a typical construction of an image pickup apparatus according to a third embodiment of the present invention.
Figure 10:
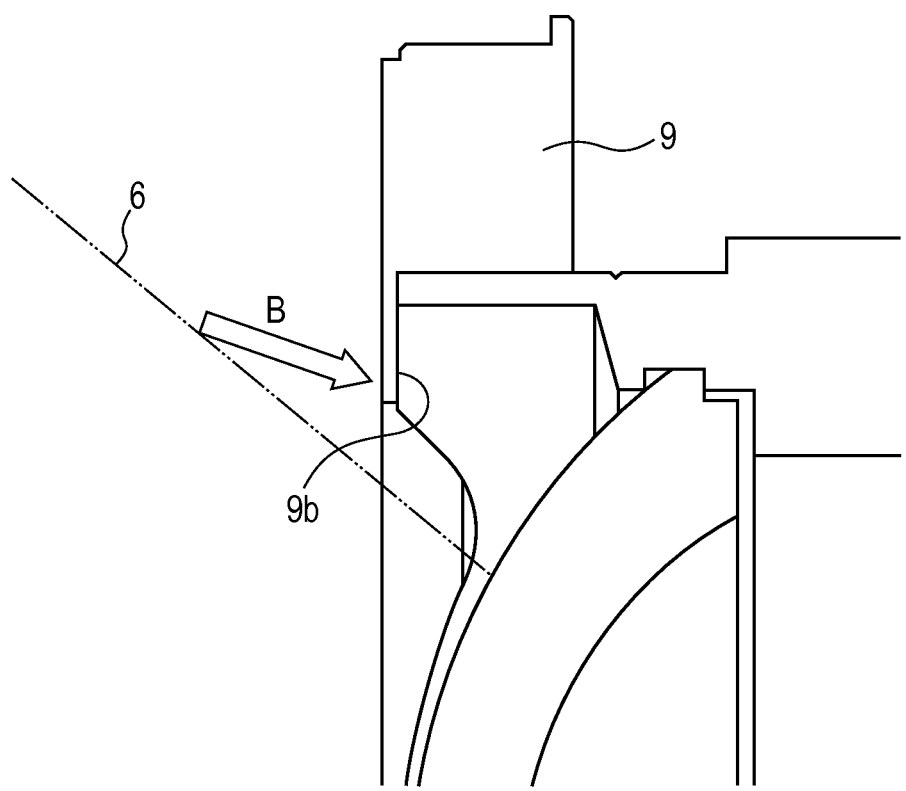
FIG. 10 is a cross sectional view of the image pickup apparatus according to the third embodiment of the present invention.

FIG. 9 shows a typical construction of an image pickup apparatus using an optical accessory adapter according to the third embodiment of the present invention. In this apparatus, an optical accessory (not shown) is attached to the front end of a lens apparatus by means of an optical accessory adapter 9. The other configurations of the lens apparatus and the optical accessory adapter 9 are the same as those in the first or second embodiment and will not be described further.

The optical accessory adapter 9 is provided with a nearly rectangular cutout portion 9a. The long side edges of the cutout portion 9a constitute edges of a light blocking portion 9b, which also serves as a lens abutting portion. The sides of the outer contour of the cutout portion 9a and the sides of the edge of the light blocking portion 9b form parts of the short sides and the long sides of the nearly rectangular shape. The optical accessory adapter 9 according to this embodiment has the light blocking portion 9b, which extends inside the attachment diameter of the lens apparatus 2. The light blocking portion 9b blocks unwanted light B coming to the lens apparatus through the region outside the imaging rays 6, as shown in FIG. 10

As described above, this embodiment can provide excellent images by virtue of the light blocking portion serving as an effective hood, while achieving advantages same as the first and second embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-032152, filed Feb. 21, 2013, which is hereby incorporated by reference herein in its entirety.

What is claimed is:
1. An adapter for coupling an optical accessory to an object side portion of the lens apparatus, where a fitting attachment diameter of the optical accessory is larger than a fitting attachment diameter of the lens apparatus, the adapter comprising:
an inner diameter portion that fits the object side portion of the lens apparatus;
an outer diameter portion that fits the optical accessory; and
recessed areas that are separated from each other along a circumferential direction of the inner diameter portion,
wherein a diameter of the outer diameter portion is larger than a diameter of the inner diameter portion, and
wherein each of the recessed areas extends in an axial direction toward a side from which the lens apparatus is fit so that a width of a part of the inner diameter portion in the axial direction is smaller than a width in the axial direction in other part of the inner diameter portion.

2. The adapter according to claim 1, wherein the recessed areas do not pass through the adapter along a direction in which light passes through the inner diameter portion.

3. The adapter according to claim 1, further comprising an angle phase determining unit usable to determine an attachment angle of the adapter and the lens apparatus.

4. The adapter according to claim 3, wherein the angle phase determining unit comprises a projection provided on the inner diameter portion, and is projectable/retractable in a radial direction, and is receivable in a recess provided on an outer circumferential portion of the lens apparatus, upon the adapter being coupled to the lens apparatus.

5. The adapter according to claim 3, wherein:
the angle phase determining unit comprises a recess provided on the inner diameter portion, and
the recess receives a projection provided on an outer circumferential portion of the lens apparatus upon the adapter being coupled to the lens apparatus.

6. The adapter according to claim 1, further comprising a light blocking portion extending inside the inner diameter portion.

7. The adapter according to claim 6, wherein a side of the contour of the recessed areas and an edge of the light blocking portion form a part of short sides and long sides of a nearly rectangular shape respectively.

8. The adapter according to claim 1, wherein the recessed areas are configured so that imaging rays of an image pickup apparatus pass through the lens apparatus while the adapter couples the optical accessory to the lens apparatus.

9. The adapter according to claim 1, wherein the inner diameter portion has a lens abutting portion that extends inwardly in a radial direction to which the lens apparatus abut when the lens apparatus is mounted to the adapter.

10. The adapter according to claim 1, wherein the recessed areas are symmetrical to each other.

11. The adapter according to claim 1, wherein the part of the inner diameter portion is positioned in the recessed areas, and the other part of the inner diameter portion is not positioned in the recessed areas.

12. An optical system comprising:
a lens apparatus;
an optical accessory; and
an adapter that couples the optical accessory to an object side portion of the lens apparatus,
wherein a fitting attachment diameter of the optical accessory is larger than a fitting attachment diameter of the lens apparatus,
wherein the adapter comprises:
an inner diameter portion that fits the object side portion of the lens apparatus;
an outer diameter portion that fits the optical accessory; and
recessed areas that are separated from each other along a circumferential direction of the inner diameter portion,
wherein a diameter of the outer diameter portion is larger than a diameter of the inner diameter portion, and
wherein each of the recessed areas extends in an axial direction toward a side from which the lens apparatus is fit so that a width of a part of the inner diameter portion in the axial direction is smaller than a width in the axial direction in other part of the inner diameter portion.

13. The optical system according to claim 12, wherein the recessed areas are configured so that imaging rays of an image pickup apparatus pass through the lens apparatus pass.

14. The optical system according to claim 12, wherein the inner diameter portion fits the object side portion, which has a petal shape.

15. The optical system according to claim 12, wherein the part of the inner diameter portion is positioned in the recessed areas, and the other part of the inner diameter portion is not positioned in the recessed areas.

16. An image pickup apparatus comprising:
a lens apparatus; and
an adapter that couples an optical accessory to an object side portion of the lens apparatus,
wherein a fitting attachment diameter of the optical accessory is larger than a fitting attachment diameter of the lens apparatus, and
wherein the adapter comprises:
an inner diameter portion that fits the object side portion of the lens apparatus;
an outer diameter portion that fits the optical accessory; and
recessed areas that are separated from each other along a circumferential direction of inner diameter portion,
wherein a diameter of the outer diameter portion is larger than a diameter of the inner diameter portion, and
wherein each of the recessed areas extends in an axial direction toward a side from which the lens apparatus is fit so that a width of a part of the inner diameter portion in the axial direction is smaller than a width in the axial direction in other part of the inner diameter portion.

17. The image pickup apparatus according to claim 16, wherein the recessed areas are configured so that imaging rays pass through the lens apparatus.

18. The image pickup apparatus according to claim 16, wherein the inner diameter portion fits the object side portion, which has a petal shape.

19. The image pickup apparatus according to claim 16, wherein the part of the inner diameter portion is positioned in the recessed areas, and the other part of the inner diameter portion is not positioned in the recessed areas.

* * * * *